(12) United States Patent
Ariga et al.

(10) Patent No.: US 6,490,541 B1
(45) Date of Patent: Dec. 3, 2002

(54) METHOD AND APPARATUS FOR VISUAL MEASUREMENT

(75) Inventors: Kozo Ariga, Kawasaki (JP); Koichi Komatsu, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 49 days.

(21) Appl. No.: 09/597,551

(22) Filed: Jun. 19, 2000

(30) Foreign Application Priority Data

Jun. 25, 1999 (JP) ............................................. 11-179775

(51) Int. Cl.⁷ ................................................ H04N 7/18
(52) U.S. Cl. ........................... 702/158; 702/85; 702/94; 702/127; 702/150; 702/159
(58) Field of Search .............................. 702/85, 94, 95, 702/40, 28, 127, 159, 150, 152, 189, FOR 131, FOR 132, FOR 134, FOR 144, FOR 170; 396/106, 127, 125, 121, 122, 123; 356/609, 624; 250/208.1, 559.05, 559.07, 559.08, 559.22, 559.29, 553.3; 348/94; 382/151, 144, 145

(56) References Cited

U.S. PATENT DOCUMENTS

| | | | |
|---|---|---|---|
| 4,794,648 A | * 12/1988 | Ayata et al. .................... 382/8 |
| 5,404,163 A | * 4/1995 | Kubo .......................... 348/142 |
| 5,477,244 A | * 12/1995 | Shibata et al. ................. 347/19 |
| 5,554,983 A | * 9/1996 | Kitamura et al. ............ 340/937 |
| 5,579,078 A | * 11/1996 | Suzuki ......................... 396/51 |
| 5,757,287 A | * 5/1998 | Kitamura et al. ............ 340/937 |
| 5,864,360 A | * 1/1999 | Okauchi et al. ................. 348/47 |
| 5,913,080 A | * 6/1999 | Yamada et al. ................ 396/51 |
| 5,973,772 A | * 10/1999 | Fukuma et al. .............. 356/124 |
| 6,049,385 A | * 4/2000 | Norita et al. ................. 356/376 |
| 6,118,943 A | * 9/2000 | Ohsawa ........................ 396/51 |
| 6,278,489 B1 | * 8/2001 | Hirasawa ..................... 348/348 |

FOREIGN PATENT DOCUMENTS

JP          07270124       * 10/1995

OTHER PUBLICATIONS

S.K. Nayar et al., "Shape from Focus: An Effective Approach for Rough Surface," IEEE, 1990, CH2876–1/90/0000/0218$01.00, pp. 218–225.

Shape from Focus: An Effictive Approach for Rough Surfaces, Nayar et al., pp. 218–225.

* cited by examiner

Primary Examiner—Marc S. Hoff
Assistant Examiner—Carol S Tsai
(74) Attorney, Agent, or Firm—Oliff & Berridge, PLC

(57) ABSTRACT

An apparatus for visual measurement is provided, which can measure a plurality of portions on a work at a high speed. An image pick-up system (3), including an optical system (5, 6) and a CCD camera (4), picks up an image of a work (2) to obtain image data. The image pick-up system (3) is driven in the Z axial direction by a driving motor (7). A displacement of the image pick-up system (3) in the Z axial direction is measured by a scale counter (8). A computer (10) reads image data from the CCD camera (4) and a Z value from the scale counter (8) into respective memories (11, 9) with a constant time interval. A contrast arithmetic unit (12) computes a contrast value at each of a plurality of different regions of image data obtained at each z axial position by the image pick-up system (3). It determines a measure for the each region based on the position of the image pick-up system (3) in the z axial direction when the contrast value comes to the maximum in the each region.

11 Claims, 4 Drawing Sheets

| Z | I | 1 | 1 | 1 | ------ | M |
|---|---|---|---|---|--------|---|
|   | J | 1 | 2 | 3 | ------ | N |
| $Z_1$ |   | $C_{11}(Z_1)$ | $C_{12}(Z_1)$ | $C_{13}(Z_1)$ | ------ | $C_{MN}(Z_1)$ |
| $Z_2$ |   | $C_{11}(Z_2)$ | $C_{12}(Z_2)$ | $C_{13}(Z_2)$ | ------ | $C_{MN}(Z_2)$ |
| $Z_3$ |   | $C_{11}(Z_3)$ | $C_{12}(Z_3)$ | $C_{13}(Z_3)$ | ------ | $C_{MN}(Z_3)$ |

FIG. 4 A 1
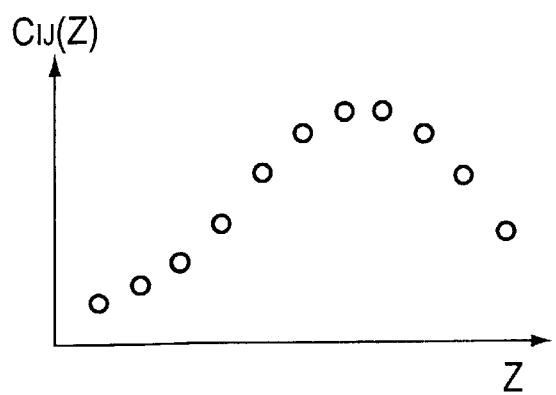
FIG. 4 A 2
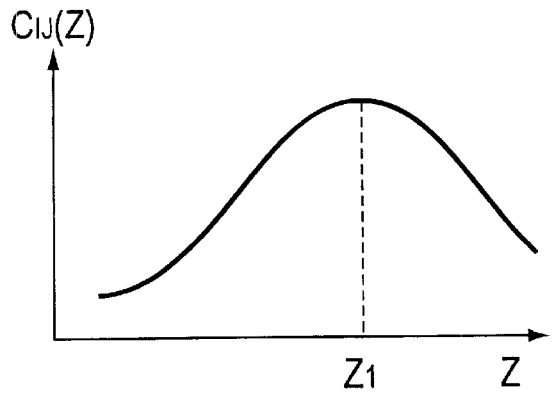
FIG. 4 A 3
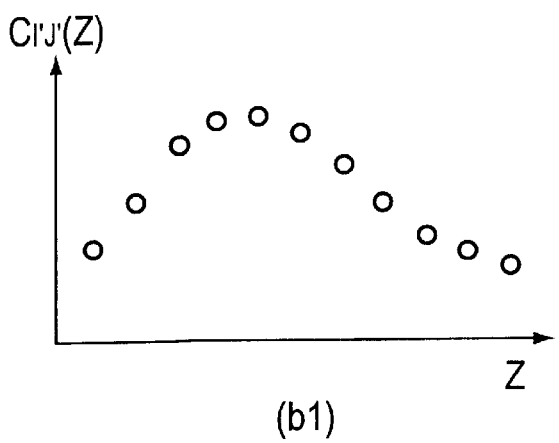
(b1)
FIG. 4 A 4
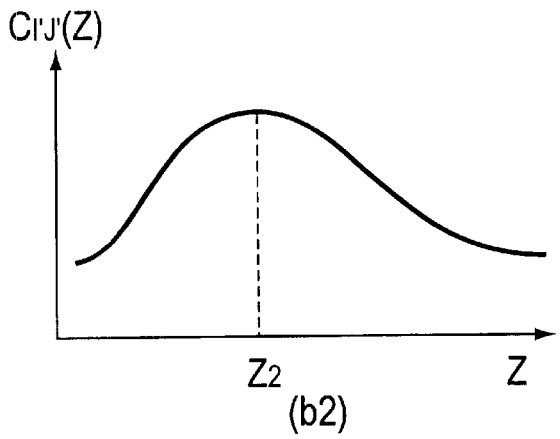
(b2)
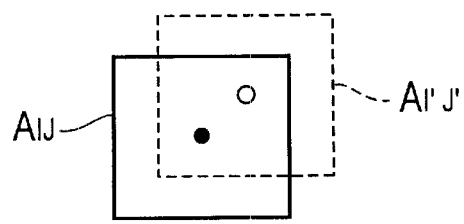
FIG. 6

METHOD AND APPARATUS FOR VISUAL MEASUREMENT

BACKGROUND OF THE INVENTION

1. Field of the Invention

The present invention relates to a method and apparatus for visual measurement, which detects a focusing position for an object to be measured from contrast values of image information obtained by an image pick-up system and measures a displacement of the object along the optical axis based on the focusing position.

2. Description of the Related Art

One of non-contact vision measuring machine known in the art focuses an optical image of a work, or an object to be measured, onto a photoreceptive surface of an image pick-up device to measure a displacement of the object along the optical axis. This visual measurement system computes an image contrast value based on a variance of brightness of an image data obtained from the image pick-up device such as a CCD (Charge Coupled Device) that picks up an image of the work. A position of the image pick-up system relative to the work is determined so as to maximize the image contrast value. A displacement of the image pickup system along the optical axis can be computes based on the position. In such the conventional visual measurement system, a position particularly desired to measure can be specified through an operation for setting a window.

In the conventional visual measurement system mentioned above, however, it is required, when plural portions on the work are subjected to measurement, to set the same number of windows and repeat the measurement. This causes a disadvantage to increase a time period for measurement.

SUMMARY OF THE INVENTION

The present invention has been made in consideration of the above and accordingly has an object to provide a method and apparatus for visual measurement capable of measuring a plurality of portions on a work at a high speed.

The present invention is provided with an apparatus for visual measurement, which comprises an image pick-up system for picking up an image of an object to be measured to obtain image information. The image pick-up system includes an optical system and image pick-up means. Driving means shifts a focal position, located at the object side, of the image pick-up system along the optical axis relatively to the object. Measurement means measures a relative displacement of the focal position of the image pick-up system along the optical axis. Arithmetic means computes an image contrast value at each of a plurality of different regions of the image information obtained at each relative focal position by the image pick-up system during the driving means relatively shifts the focal position of the image pick-up system along the optical axis. It determines a measure for the each region based on the relative displacement along the optical axis obtained from the measurement means when the image contrast value comes to the maximum in the each region.

The present invention is also provided with a method for visual measurement. In the step of shifting, an image pick-up system is relatively shifted for an object to be measured to the initial position, and then a relative focal position of the image pick-up system is relatively shifted along the optical axis together with picking up an image of the object by the image pick-up system. In the step of reading, with a constant time interval during the whole time period of shifting the relative focal position of the image pick-up system, the relative focal position (Z value) is read. Each contrast value in each of a plurality of different regions of image information obtained by the image pick-up system is also read. In the step of stopping, the image pick-up system is stopped when the relative focal position of the image pick-up system comes to the final position. In the step of presuming, for the each region, a contrast Curve is presumed, which indicates a relation of the contrast value to the relative focal position of the image pick-up system. In the step of computing, the relative focal position (Z value) of the each region in computed from the contrast curve of the each region.

According to the present invention, a contrast value is computed for each of a plurality of different regions of the image information obtained at each relative focal position, with shifting the relative focal position of the image pick-up system. A measure for each region is determined based on the relative displacement along the optical axis when the contrast value comes to the maximum in each region. Therefore, the relative displacement can be computed for each region only with one relative scanning of the image pick-up system along the optical axis. This leads to an extremely high-speed measurement.

Each region used for computing the contrast value may partly overlap with each other. This overlap allows computation of relative displacements of much more points based on a sufficient amount of data. The arithmetic means may presume, for each region, from the contrast values obtained at each relative focal position by the image pickup system, a curve of contrast values relative to the relative displacement of the image pick-up system along the optical axis. It determines the relative displacement at each region along the optical axis based on the curve of contrast values. In this case, a high resolution can be achieve by the presumed curve, with reducing an arithmetic time by a rough sampling.

Other features and advantages of the invention will be apparent from the following description of the preferred embodiments thereof.

BRIEF DESCRIPTION OF TEE DRAWINGS

The present invention will be more fully understood from the following detailed description with reference to the accompanying drawings in which.

Figure 1:
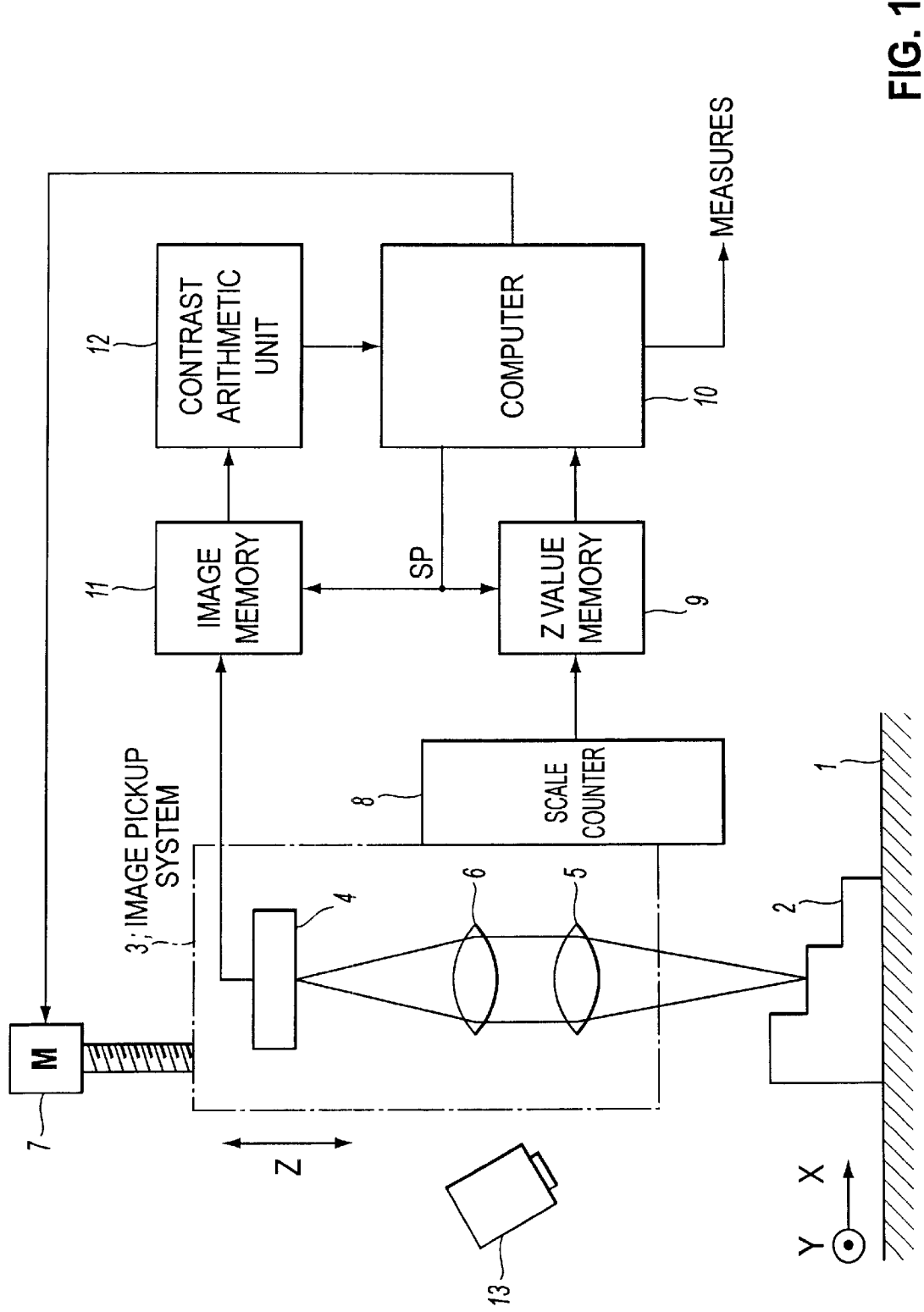
FIG. 1 is a block diagram showing an arrangement of an apparatus for visual measurement according to an embodiment of the present invention.
Figure 5:
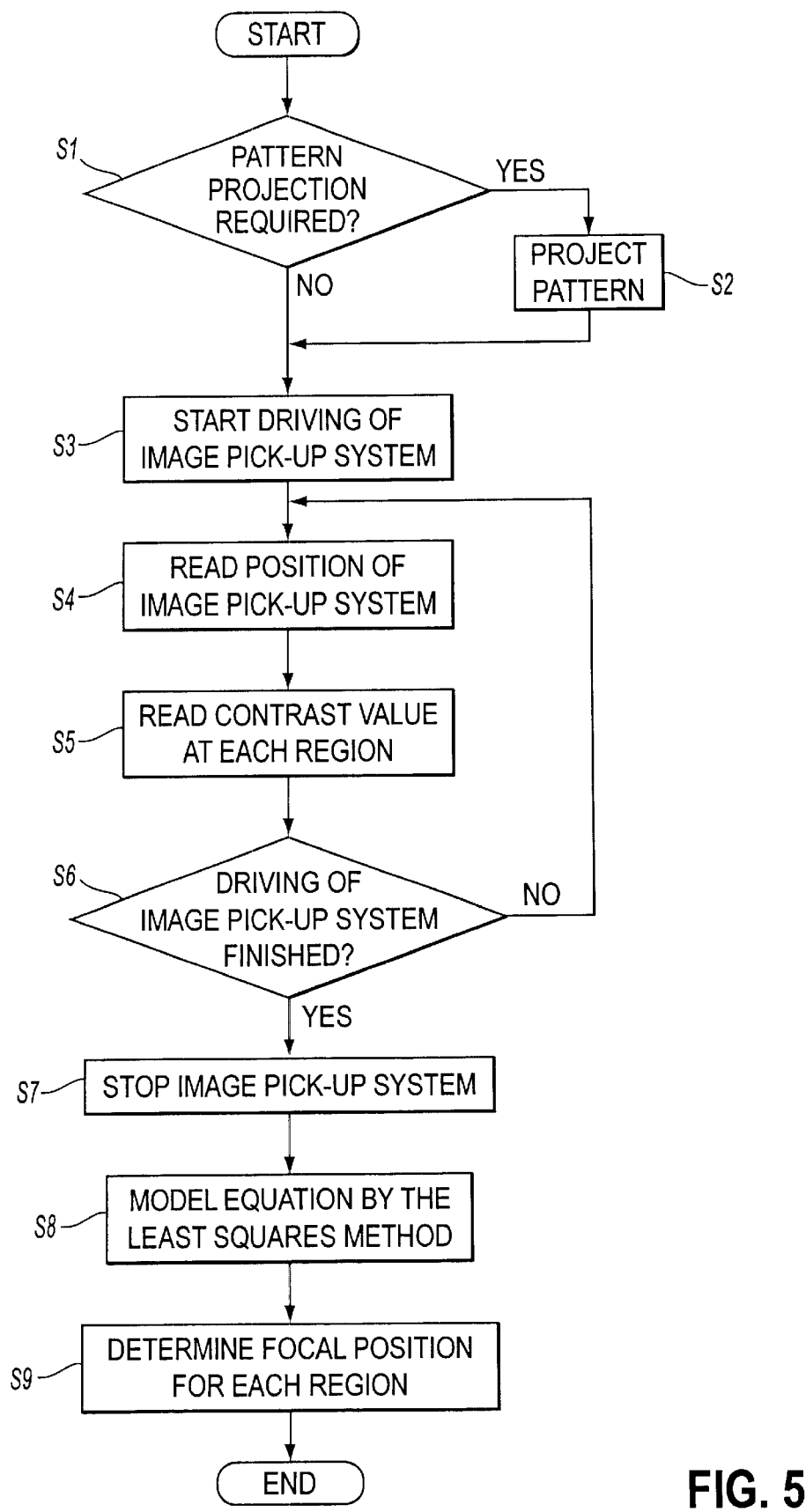

FIGS. 4A1–4A4 show contrast curves resulted from the above embodiment;

FIG. 5 is a flowchart showing an operation of the apparatus of the above embodiment; and FIG. 6 illustrates another embodiment of the present invention.

DETAILED DESCRIPTION OF THE PREFERRED EMBODIMENTS

Embodiments of the present invention will be described below with reference to the drawings.

FIG. 1 is a block diagram showing an arrangement of an apparatus for visual measurement according to an embodiment of the present invention. Mounted on a table 1 is a work 2, which is an object to be measured. An image pick-up system 3 is arranged to pick up an image of the work 2. The image pick-up system 3 includes a CCD camera 4 for picking up the image of the work 2 and an optical system with lenses 5 and 6 for focusing the optical image of the work 2 onto an image pick-up surface of the CCD camera 4. The image pick-up system 3 is driven by a driving motor 7 toward the work 2 in the optical axial direction, that in, z axial (up/down) direction in the figure. This mechanism can shift the focal position of the image pick-up system 3 relative to the work 2. A scale counter 8 measures a displacement of the image pick-up system 3 in the Z direction (Z value).

A computer 10 feeds a driving signal to the motor 7 and generates a sampling signal SP with a constant time interval. Image data of the work 2 captured by the CCD camera 4 is stored in an image memory 11 in accordance with the sampling signal SP. The image data stored in the image memory 11 is then supplied to a contrast arithmetic unit 12, where a contrast value is computed for each region. The displacement value, output from the scale counter 8, is on the other hand stored into a z value memory 9 in accordance with the sampling signal SP. On the basis of the contrast values computed at the contrast arithmetic unit 12 and the Z values stored in the Z value memory 9, the computer 10 computes a measure for each region based on the Z value that realizes the maximum contrast value. The computer outputs the measure to the external. Desirable contrast values may not be obtained possibly if the surface of the work 2 is, for example, in mirrored surface state. To avoid this situation, a pattern projector 13 in arranged opposing to the work 2. The pattern projector 13 projects a stripe or grid pattern onto the surface of the work 2.

Operations of thus configured apparatus for visual measurement according this embodiment will be described next.

Figures 2, 3:
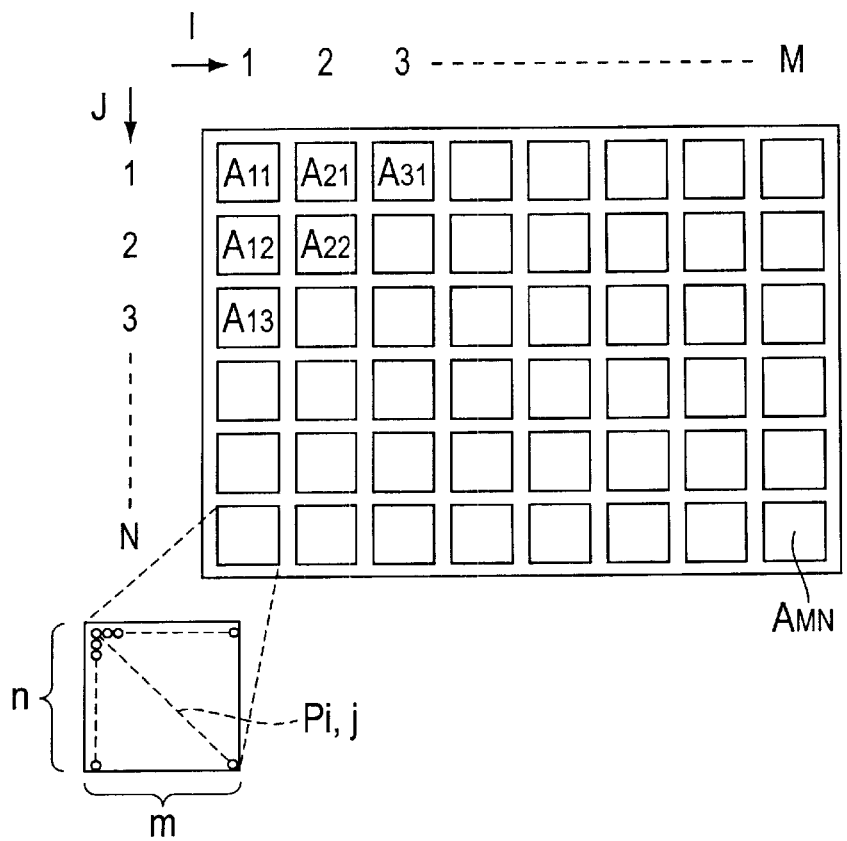
FIG. 2 illustrates the principle of the above embodiment.
FIG. 3 shows contrast data resulted from the above embodiment.

FIG. 2 illustrates the operational principle of this apparatus. As shown in the figure, M×N sub-regions $A_{IJ}$, each consisting of m×n pixels (m and n are each an arbitrary integer), are now set for image data. The image data is obtained from the CCD camera 4 when the displacement of the image pick-up system 3 along the optical axis is equal to Z, which in obtained from the scale counter 8. on the assumption that each sub-region $A_{IJ}$ has a contrast value of $C_{IJ}(Z)$, it can obtained as follows:

$$C_{IJ}(Z) = \sum_{j=1}^{n} \sum_{i=1}^{m-1} \{P_{i+1,j}(Z) - P_{1,j}(Z)\}^2 \quad (1)$$

where $P_{I,j}(Z)$ denotes a brightness of a pixel at a position (i,j) within the sub-region $A_{IJ}$ when the Z axial displacement is equal to Z.

From the equation (1), the contrast value $C_{IJ}$ in each sub-region $A_{IJ}$ can be computed. Through computation of this contrast value at each Z-position, contrast values $C_{IJ}(Z)$ in each sub-region $A_{IJ}$ and at each Z value can be obtained as shown in FIG. 3. Plotting the contrast values $C_{IJ}$ at every position in the same sub-region $A_{IJ}$ results in discrete data as shown in FIG. 4A1. From the discrete data, a contrast curve can be obtained as shown in FIG. 4A2, using well-known curve presuming methods such as the least squares method. The displacement $Z_i$ in the Z direction, at which the contrast curve exhibits the maximum, is a measure for the displacement in the Z direction at the sub-region $A_{IJ}$. An for another sub-region $A_{IJ}'$, discrete data in similarly obtained as shown in FIG. 4A3 and a contrast curve as shown in FIG. 4A4.

FIG. 5 is a flowchart showing process steps for the computer 10 to execute the above processes.

First the computer 10 determines whether a pattern projection is required due to the nature of the work 2 (S1). If required (YES), the pattern projector 13 projects a pattern (S2). Next, the driving motor 7 shifts the image pick-up system 3 back to the initial position and then starts to drive the image pick-up system (S3). The computer 10 outputs the sampling signal SP at a constant time interval to read the position of the image pick-up system (Z value) and the contrast value at each region (S4, S5). These steps are repeated until the driving of the image pick-up system is finished (S6). When the image pick-up system 3 reaches the end position of the driving, then the computer 10 stops the image pick-up system 3 (S7). The computer 10 next computes a curve model (an equation model) of the contrast curve for each sub-region by the least squares method (S8) and computes a focal position (Z value) for each sub-region from the resultant contrast curve (S9). For example, n-order curves, hyperbolic curves or the like can be used as these curve models.

Through the above processes, displacements in the z direction of a plurality of regions can be computed only with one scanning of the image pick-up system 3 along the optical axis. Therefore, a high-speed processing can be achieved.

The smaller the size of each sub-region, the higher the density of the measurement points to be computed. Accordingly, further precisely measured results are obtained and thus a 3-D curved surface can be presumed easily. To the contrary, however, an amount of data for use in computation of the contrast value reduces and this invites noises to affect on the contrast value easily. Accordingly, as shown in FIG. 6, regions $A_{IJ}$ and $A_{IJ}'$ are determined to partially overlap with each other. This requires no large reduction of the region for contrast computation and can increase the density of the measurement points.

In the above embodiments, each relative position between the lenses 5, 6 in the optical system and CCD camera 4 is fixed, and thus the focal position at the work 2 side in fixed in the image pick-up system 3. Therefore, the displacement of the image pick-up system 3 is measured by the scale counter 8 when the whole image pick-up system 3 is displaced in the z direction relative to the work 2.

To the contrary, the displacement of the table 1 may also be measured by the scale counter 8 when the table 1 is shifted in the z direction, mounting the work 2 thereon, along with securing or stopping the image pick-up system 3. This modification may be selected on the basis of the difference in the total size and arrangement of the apparatus and leads to realize an apparatus that does not sacrifice an ease of use.

On the other hand, in another embodiment, the lens in the optical system is designed movable to vary the focal position. In this embodiment, the driving motor 7 in FIG. 1 is not directed to drive the image pick-up system 3, rather drives only the lens 5 (focusing lens) individually. The scale counter is configured to measure the displacement of the lens 5 relative to the image pick-up system 3 instead of the displacement of the image pick-up system 3. In this case, since the optical system itself can vary the focal position, a relative position of the image pick-up system 3 to the work 2 may be constant. The second embodiment differs from the measurement procedure shown in FIG. 5 only in that: starting to drive the lens in stead of the image pick-up system at S3; reading the position of the lens instead of the image pick-up system at S4; determining the finish of driving the lens instead of the image pick-up system at S6; and stopping the lens instead of the image pick-up system at S7, The remaining of the second embodiment is the same as the first embodiment.

This embodiment has an advantage over the first embodiments the movable portion among the whole image pick-up system consists only of the lens system, having a small movable weight. As a result, a precise positioning can be achieved. In addition, since the necessary driving power is low, the affection to the measurement environment in small. Thus, this arrangement is suitable for performing a precise measurement in total.

In contrast, the first embodiment has an advantage over this embodiment: the structure of the optical system can be relatively simplified and thus is hardly affected from the deterioration with age, reducing the production cost, The pattern projector 13 may be integrated with the apparatus for visual measurement or with the image pick-up system 3, or incorporated in the internal of the image pick-up system 3, if required.

A further embodiment may comprise a means for shifting the image pick-up system 3 and the table 2 relative to each other in the direction perpendicular to the optical axis in addition to the first embodiment. For example, an X-Y table can be employed for the table 1. This allows it to measure the whole area of a large work to assume the entire 3D-curved surface.

At least the image pick-up system 3 may be designed attachable to and detachable from other measurement touch signal probe commonly employed in a CMM (Coordinate Measuring Machine) may allow the image pick-up system 3 or the apparatus for visual measurement itself to be attached to the CMM. This eases the visual measurement for an arbitrary position on the work. The use of a probe head for attaching the image pick-up system 3 to the CMM allows it to measure the work from any angles, if required.

As obvious from the above, according to the present invention, a contrast value is computed for each of a plurality of different regions of the image information obtained at each focal position, with shifting the focal position of the image pick-up system. A measure for each region is determined based on the displacement along the optical axis when the contrast value comes to the maximum in each region. Therefore, the displacement can be computed for each region only with one scanning of the image pick-up system along the optical axis. This leads to an extremely high-speed measurement. These are effects according to the present invention.

Having described the embodiments consistent with the present invention, other embodiments and variations consistent with the present invention will be apparent to those skilled in the art. Therefore, the invention should not be viewed as limited to the disclosed embodiments but rather should be viewed an limited only by the spirit and scpe of the appended claims.

What is claimed is:

1. An apparatus for visual measurement, comprising:
   an image pick-up system for picking up an image of an object to be measured to obtain image information, said image pick-up system including an optical system and an image pick-up means;
   a driving means for shifting a focal position of said image pick-up system and scanning along the optical axis relatively to said object, said focal position being located at said object side;
   a measurement means for measuring a relative displacement of said focal position of said image pick-up system along said optical axis; and
   an arithmetic means for computing a contrast value at each of a plurality of different regions of said image information obtained at each relative focal position by said image pick-up system during said driving means relatively shifting said focal position of said image pick-up system along said optical axis, and determining a measure for said each region based on said relative displacement along said optical axis obtained from said measurement means when said image contrast value comes to the maximum in said each region, wherein said arithmetic means computes the contrast values of the plurality of different regions of said image information with one scanning along said optical axis.

2. The apparatus for visual measurement according to claim 1, wherein said each region used for computing said contrast value partly overlaps with each other.

3. The apparatus for visual measurement according to claim 1, wherein said arithmetic means presumes, for said each region, from said contrast values obtained at said each relative focal position by said image pick-up system, a curve model of contrast values relative to said relative displacement of said image pick-up system along said optical axis, and determining said relative displacement at said each region along said optical axis based on said curve model of contrast values.

4. The apparatus for visual measurement according to claim 1, wherein said focal position at said object side in fixed relative to said image pick-up means in said image pick-up system, and wherein said driving means for shifting a focal position shifts said image pick-up system and said object relative to each other along said optical axis.

5. The apparatus for visual measurement according to claim 1, wherein said focal position at said object side is variable relative to said image pick-up means in said image pick-up system, and wherein said driving means for shifting a focal position shifts said focal position at said object in said image pick-up system along said optical axis while maintaining a constant position of said image pick-up means relative to said object.

6. The apparatus for visual measurement according to claim 1, further comprising a means for projecting a pattern.

7. The apparatus for visual measurement according to claim 1, further comprising a means for shifting said image pick-up means and said object relative to each other in the direction perpendicular to said optical axis.

8. The apparatus for visual measurement according to claim 1, wherein at least said image pick-up means is attachable to and detachable from other measurement equipment.

9. A method for visual measurement, comprising the steps of:
   relatively shifting an image pick-up system to the initial position relative to an object to be measured, and then shifting a relative focal position of said image pick-up system for scanning along the optical axis together with picking up an image of an object to be measured by said image pick-up system;
   reading, with a constant time interval, during the whole time period of shifting said relative focal position of said image pick-up system, said relative focal position (Z value), and each contrast value in each of a plurality of different regions of image information obtained by said image pick-up system;
   stopping said image pick-up system when said relative focal position of said image pick-up system comes to the final position;
   presuming, for said each region, a contrast curve indicating a relation of said contrast value to said relative focal position of said image pick-up system; and
   computing said relative focal position (Z value) of said each region from said contrast curve of said each region, wherein the contrast values of the plurality of different regions of image information obtained by said image pick-up system are read with one scanning along said optical axis.

10. The method for visual measurement according to claim 9, further comprising the step of projecting a predetermined pattern onto said object.

11. The method for visual measurement according to claim 9, wherein said each region used for computing said contrast value partly overlaps with each other.

* * * * *